Feb. 3, 1959 W. STERN 2,871,752
SCREW HAVING A DRILL POINT AND SERRATED CUTTING EDGE
Filed Aug. 14, 1957

INVENTOR.
William Stern
BY
Olson & Trexler
attys.

United States Patent Office 2,871,752
Patented Feb. 3, 1959

2,871,752

SCREW HAVING A DRILL POINT AND SERRATED CUTTING EDGE

William Stern, Park Ridge, Ill., assignor to Illinois Tool Works, Chicago, Ill., a corporation of Illinois Application August 14, 1957, Serial No. 678,237

3 Claims. (Cl. 85—47)

This invention relates generally to the art of threaded fasteners and more particularly to a drill point screw adapted to drill its own hole in sheet metal, plastic, wood, and other materials.

As is well known, various types of threaded cutting screws have been developed whereby the screws can be turned into preformed apertures and will cut their own threads therein. Such screws require the presence of an aperture in the workpiece and generally are provided with a slot or other relieved portion along one edge whereby to cause the threads to cut into the material of the workpiece adjacent an aperture.

It is an object of this invention to provide a drill point screw adapted to form and thread its own hole in material such as sheet metal, plastic, or wood.

It is a further object of this invention to provide a screw adapted to ream existing apertures in workpieces.

Other and further objects and advantages of the present invention will be apparent from the following description when taken in connection with the accompanying drawings wherein.

Figure 1:
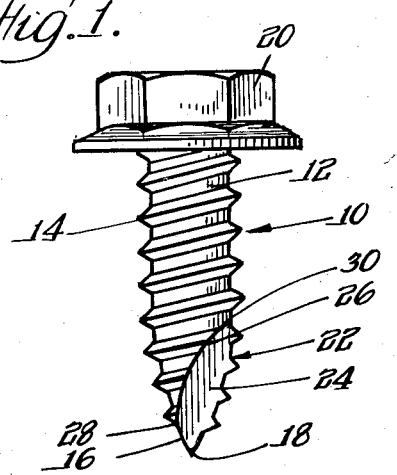
Fig. 1 is a side view of a drill point screw constructed in accordance with the principles of my invention.
Figure 2:
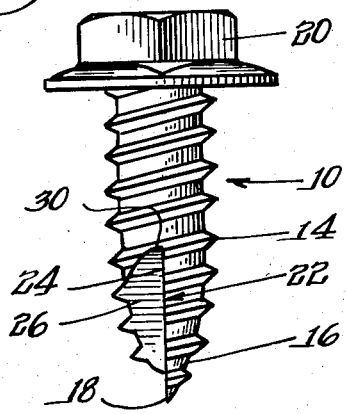
Fig. 2 is a side view thereof taken at right angles to Fig. 1.
Figure 3:
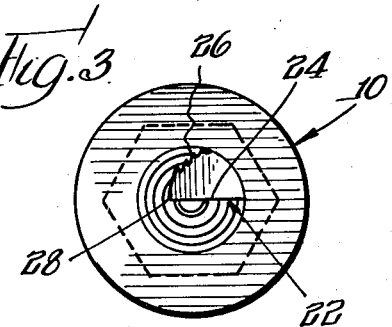
Fig. 3 is an end view of the screw as taken from the entering end thereof.

Referring now in greater particularity to the drawings, there will be seen a drill point screw designated generally by the numeral 10. The screw includes a shank 12 having a spaced thread 14. The shank has a tapered entering end at 16 approximating a point at 18. At the opposite end of the shank the screw is provided with a hexagonal washer head 20. As will be understood, other types of heads could be used and the thread would not necessarily have to be spaced.

The entering end of the screw is provided with a slot 22 of novel configuration. The slot is defined by a diametral plane 24 intersected by a curved surface 26 at right angles to the plane 24. The surface 26 is obliquely disposed relative to the centerline of the screw, and one intersection 28 of this surface with the plane 24 and with the outer surface of the shank is adjacent the point 18 at the entering end of the screw but spaced somewhat therefrom. The other intersection 30 of the curved surface 26 with the plane 24 and with the outer surface of the shank is relatively remote from the tip or point 18, and it will be seen that the two intersections referred to lie on opposite sides of the centerline of the screw.

Figure 4:
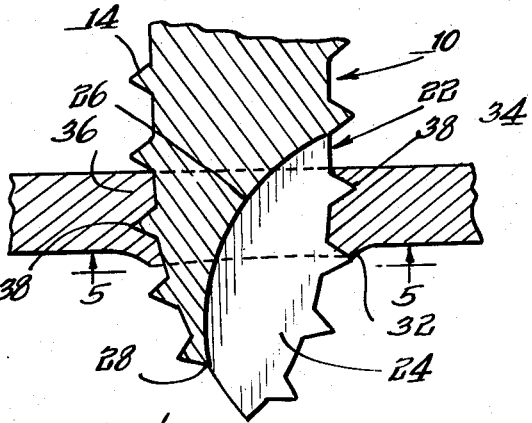
Fig. 4 is an enlarged sectional view illustrating the formation of threads by the screw.
Figure 5:
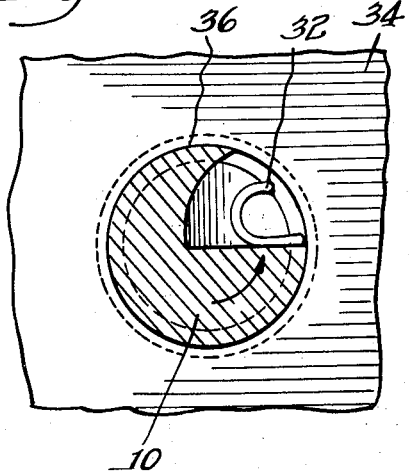
Fig. 5 is a sectional view taken along the line 5—5 in Fig. 4.

The bullet nose or gimlet tip of the screw is of great importance in forcing the initial opening through the workpiece, while the configuration of the slot 22 is important in forcing the fin or scrap away from the aperture on the backside of the panel. More particularly, the screw displaces a fin 32 which curls off of the workpiece 34 and into the slot 22 for displacement on the opposite side of the workpiece as shown in Figs. 4 and 5. Thus, the screw readily forms a hole or aperture 36 in the workpiece and cuts its own threads therein, as at 38.

Figure 6:
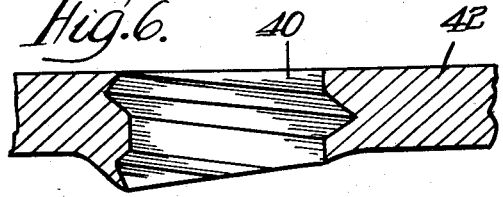
Fig. 6 is a cross sectional view showing a hole as reamed by the screw.

As will be seen with reference to Fig. 6, a reamed hole 40 may be formed in a workpiece 42, the initial hole being much smaller than that shown at 40.

The specific example of the invention as herein shown and described has been set forth for illustrative purposes only. Various changes in structure will no doubt occur to those skilled in the art and are to be understood as forming a part of this invention insofar as they fall within the spirit and scope of the appended claims.

The invention is claimed as follows:

1. A drilling and thread cutting screw fastener including a shank, said shank providing a holding section having a plurality of uninterrupted thread convolutions, an entering section having a plurality of similar thread convolutions, and an enlarged head section formed integral with the shank at the opposite extremity for accommodating a turning tool, the external and root diameters of the thread convolutions on said holding section constant over the axial extent of said holding section, the external and root diameters of the thread convolutions throughout said entering section diminishing to substantially the entering extremity of the shank so as to provide substantially an interrupted threaded point, said entering section and a very limited portion of the adjacent holding section being transversed by a single recess to provide a serrated cutting edge, said recess being defined by two intersecting surfaces, one of which is relatively flat and extends through said point and the shank axis to form the aforesaid serrated cutting edge, one end of said surface terminating in the vicinity of the juncture of the entering and holding sections of the shank and the other extremity completely traversing the entering screw extremity, and the other surface defining said recess extending obliquely to and traversing said axis for deflecting chips away from said cutting edge, the entering extremity of said chip-deflecting surface terminating sufficiently short of the screw shank extremity and disposed on the side of the shank axis opposite from the other extremity of said oblique surface to facilitate work penetration by that portion of the screw point completely traversed by said flat surface when the screw fastener is initially applied to a workpiece.

2. A drilling and thread cutting screw fastener as set forth in claim 1, wherein the chip-deflecting surface is arcuate, the entering extremity thereof being substantially tangent to a plane parallel with the screw axis.

3. A drilling and thread cutting screw fastener as set forth in claim 1, wherein the crests of the thread convolutions on the entering extremity are V-shaped.

References Cited in the file of this patent

UNITED STATES PATENTS

| 453,563 | Nicholson | June 2, 1891 |
| 2,255,997 | Hanneman | Sept. 16, 1941 |
| 2,278,377 | Cook | Mar. 31, 1942 |
| 2,403,359 | Gerhold | July 2, 1946 |

FOREIGN PATENTS

| 615,225 | Great Britain | Jan. 4, 1949 |